United States Patent [19]
Rethorst

[11] Patent Number: 5,582,123
[45] Date of Patent: *Dec. 10, 1996

[54] MULTIPLE CONCAVITY SURFING SHIP AND TRANSITION SYSTEM

[75] Inventor: Scott Rethorst, S. Pasadena, Calif.

[73] Assignee: Pioneer Engineering, Grandview, Mo.

[ * ] Notice: The term of this patent shall not extend beyond the expiration date of Pat. No. 5,398,628.

[21] Appl. No.: 388,585

[22] Filed: Feb. 13, 1995

Related U.S. Application Data

[63] Continuation-in-part of Ser. No. 261,429, Jun. 17, 1994, Pat. No. 5,398,628, which is a continuation-in-part of Ser. No. 78,604, Jun. 17, 1993, abandoned.

[51] Int. Cl.$^6$ ............................................ B63B 1/00
[52] U.S. Cl. ............................. 114/62; 114/272; 114/274
[58] Field of Search ..................... 114/56, 62, 271–274, 114/280, 282; 440/69, 70

[56] References Cited

U.S. PATENT DOCUMENTS

| | | | |
|---|---|---|---|
| 733,010 | 7/1903 | Coen | 440/70 |
| 3,274,966 | 9/1966 | Rethorst | 114/62 |
| 5,273,238 | 12/1993 | Sato | 114/272 |
| 5,398,628 | 3/1995 | Rethorst | 114/62 |

*Primary Examiner*—Jesus D. Sotelo
*Attorney, Agent, or Firm*—Hovey, Williams, Timmons & Collins

[57] ABSTRACT

The Multiple Concavity Surfing Ship and Transition System is an improvement for a surfing ship that generates a singular water wave and rides on its crest efficiently at high speeds. The improved system now adds provisions to aid in the ship's transition in lifting the ship upwards from its low speed displacement mode deep in the water to its high speed surfing mode on top of the ocean surface and to enhance stability and control during transition and cruise. Two complementary features to assist in this transition are provided, the first comprising one or more pairs of hydrofoils on either side of the ship near its bottom to increase surface area and span to lift the ship upwards at the low speed beginning of its transition, and second, one or more sets of concavities preferably symmetric nested concavities, of increasing camber on the bottom of the ship itself to reduce the wetted area in a controlled manner as the ship approaches its cruise mode at high speeds. The hydrofoils are retractable, enabling their extension for transition and cruise and their retraction for high speed cruise, if desired, as well as displacement operation in harbors and for docking. Intermediate positions of the hydrofoils also offer the possibility of dihedral to aid in roll stability. The nested bottom concavities are bounded by forward ramps and aft steps to control water contact, with the increasing camber towards the center of the nest matching the convex slope increase of the surfing wave with speed. A flexible plate bridging the innermost concavity changes its camber to match the convex slope of the surfing wave during cruise. Multiple sets of bottom concavities enhance the longitudinal stability and/or control of the ship at cruise and relaxes loading requirements about the center of gravity of the ship. Multiple pairs of hydrofoils similarly enhances stability and/or control during transition.

24 Claims, 15 Drawing Sheets

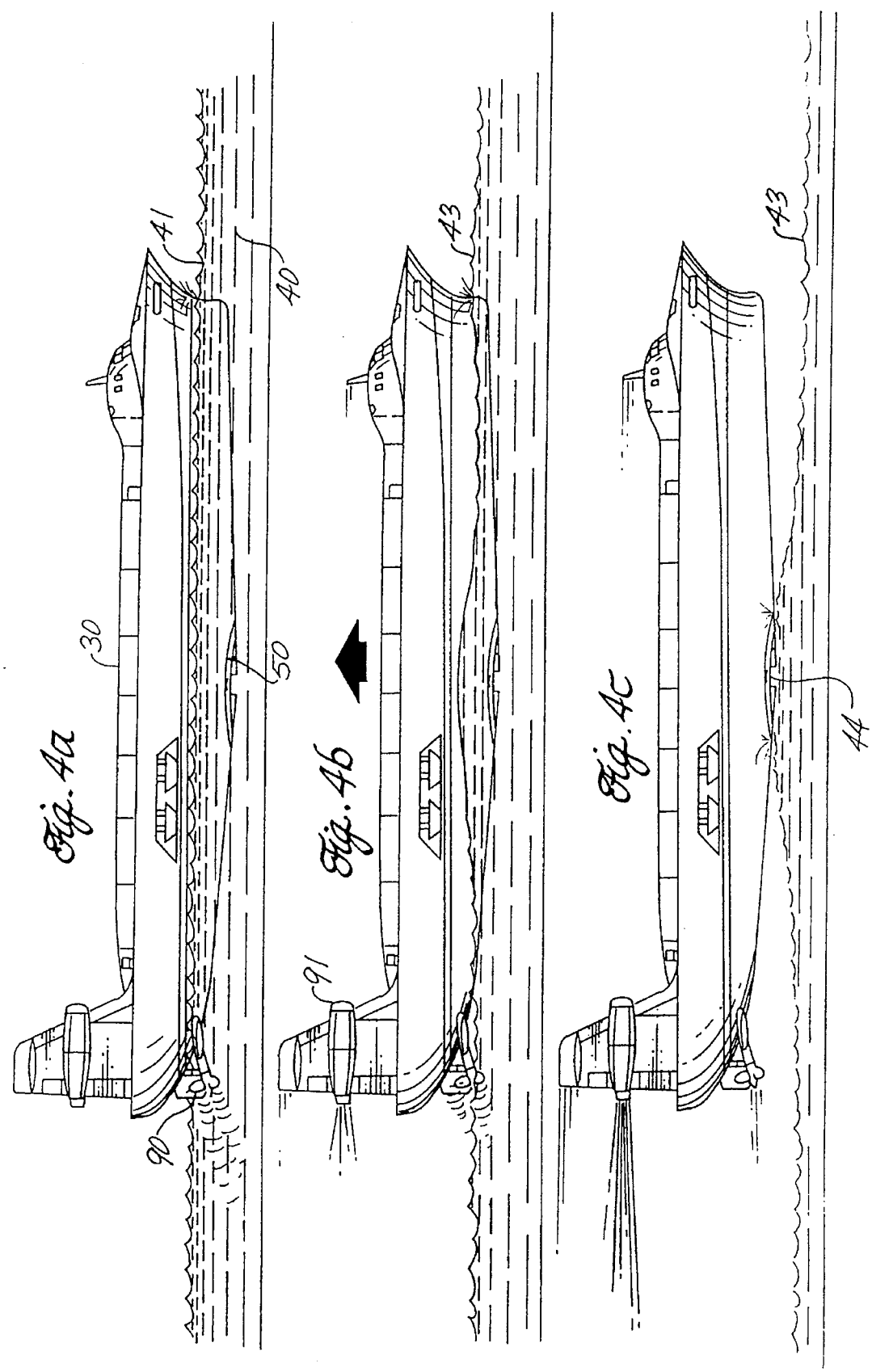

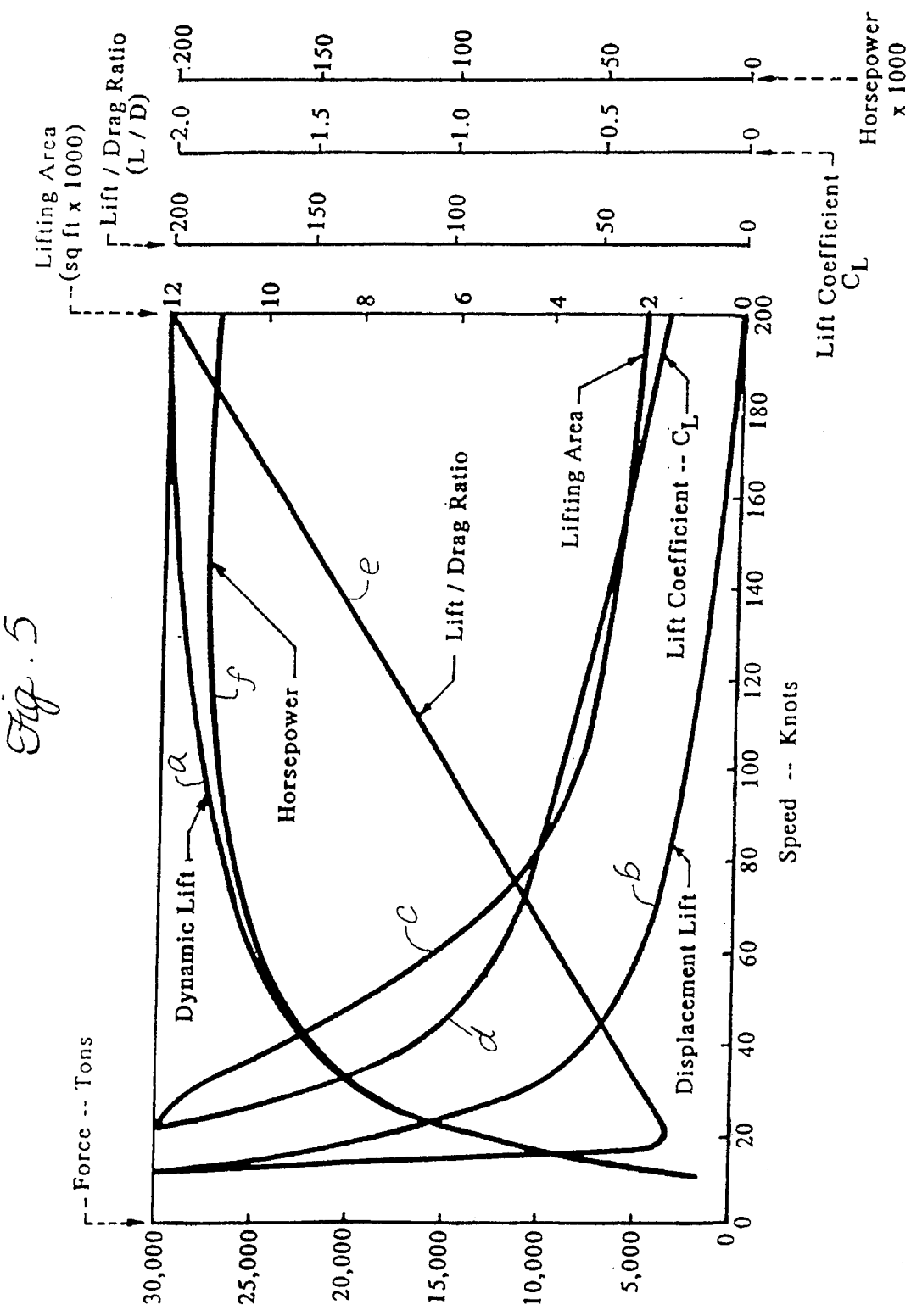

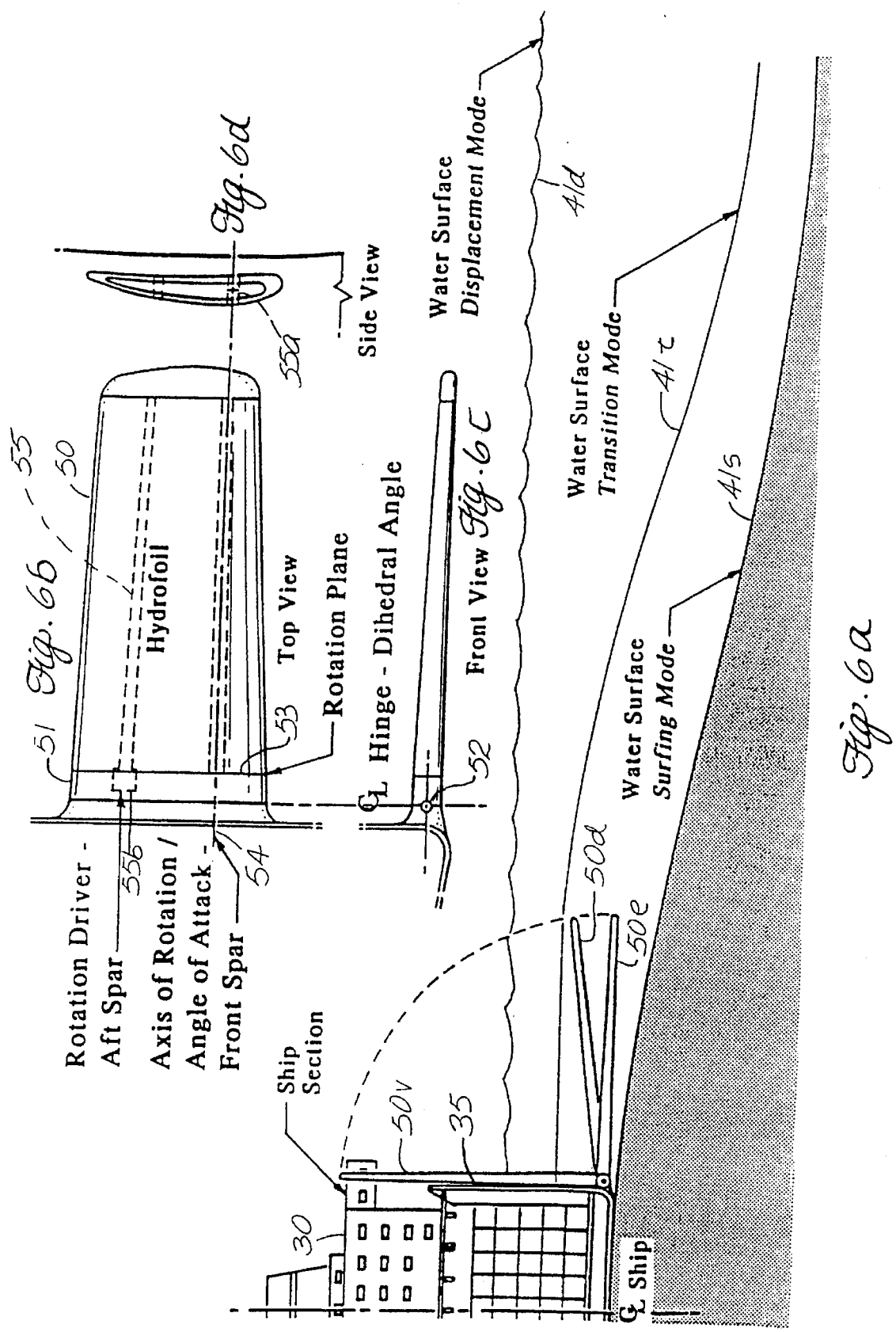

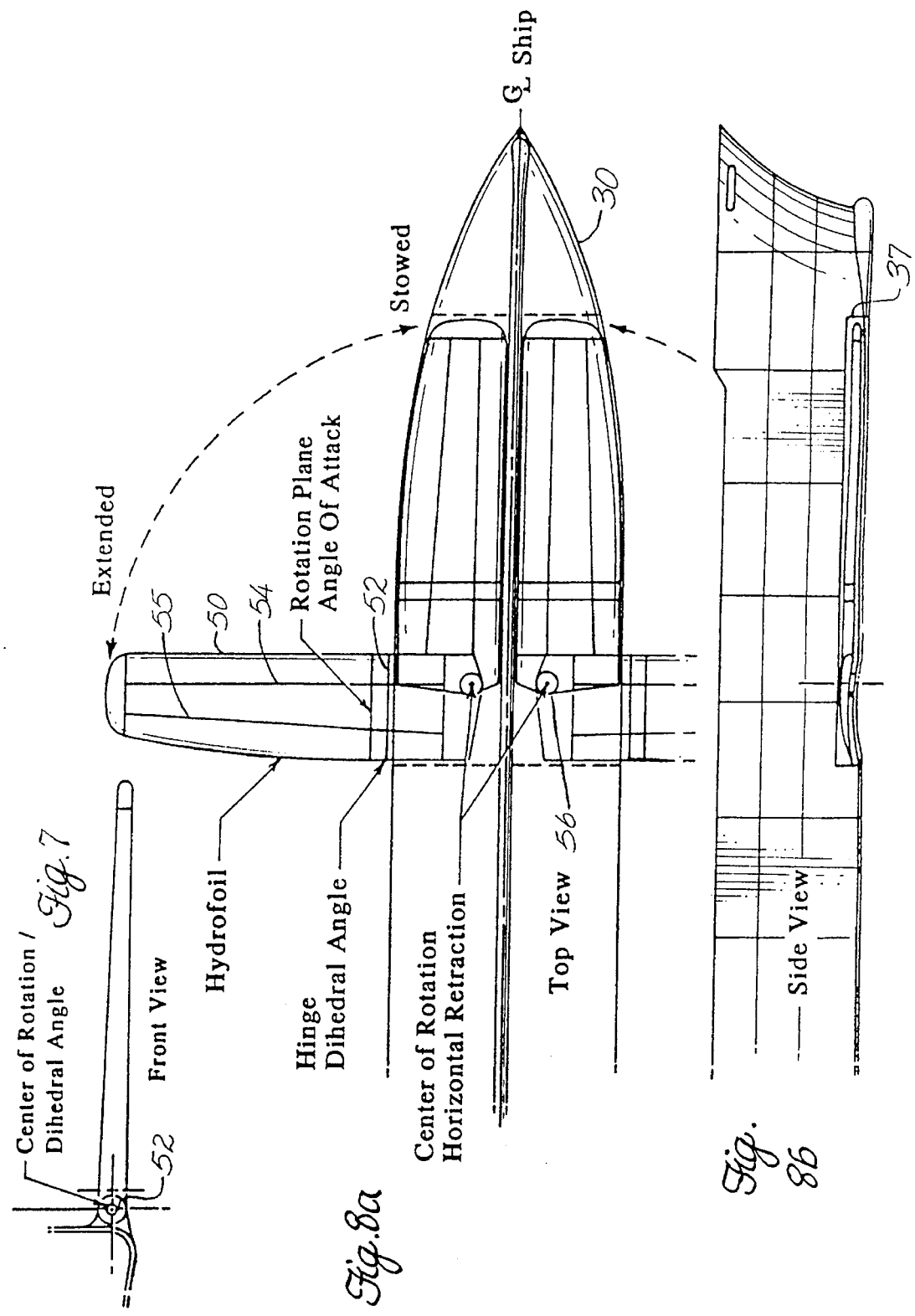

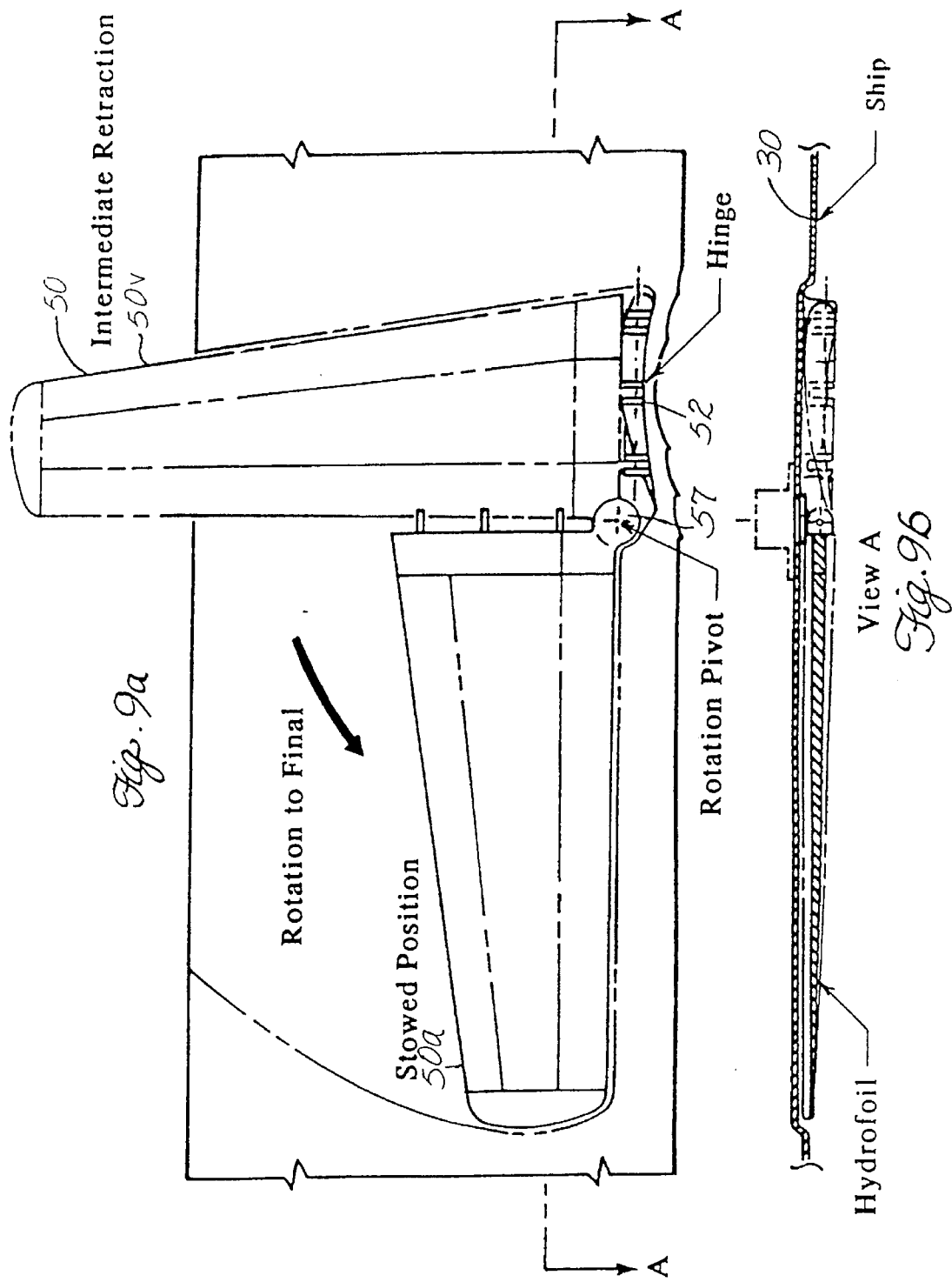

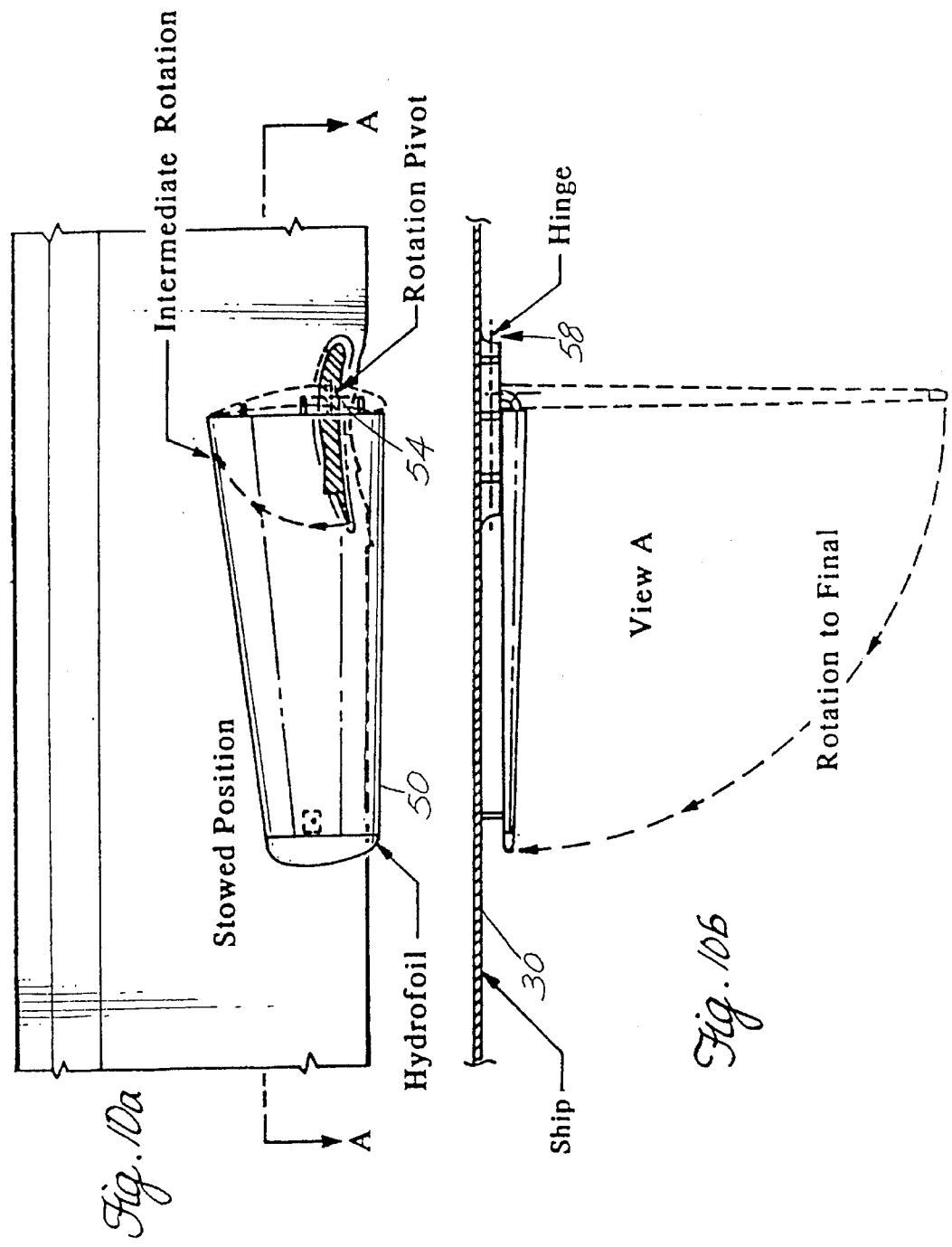

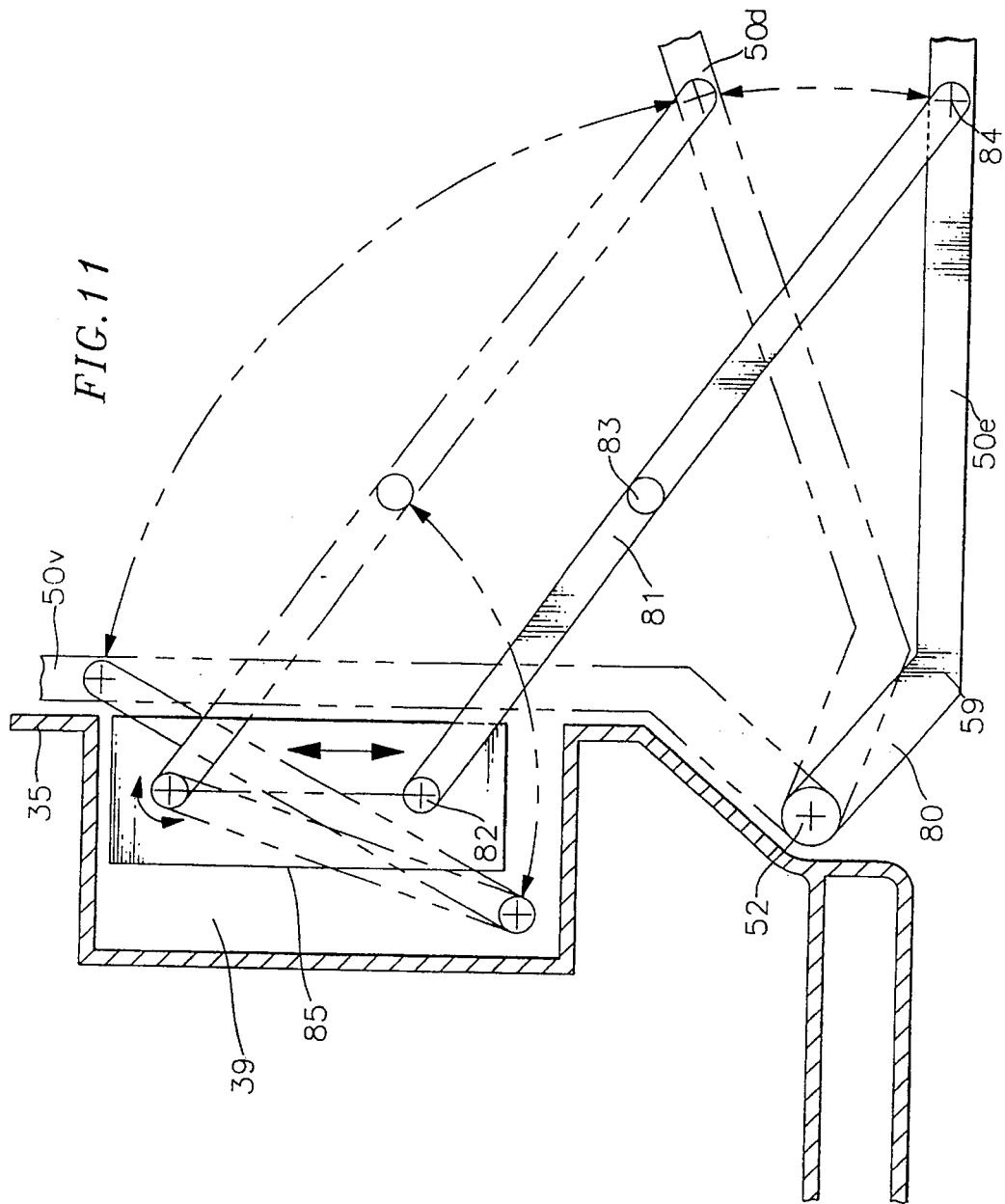

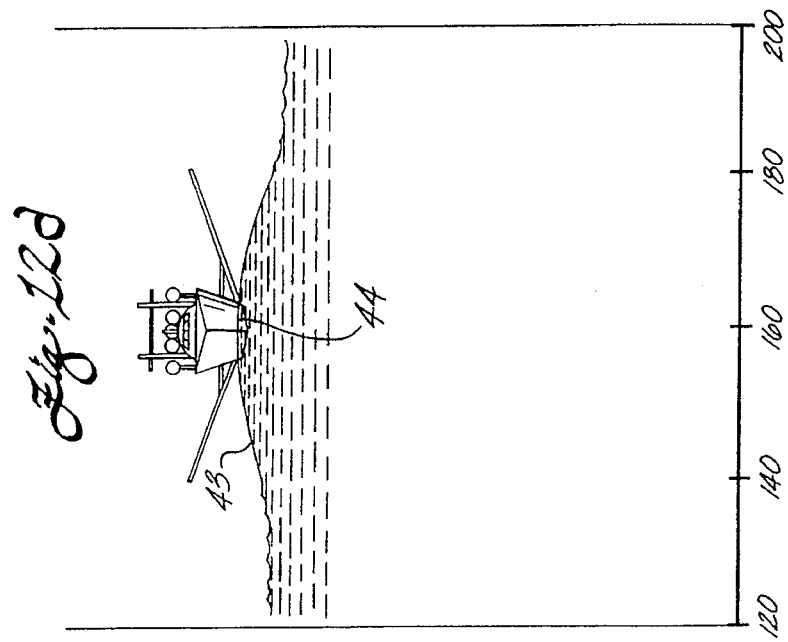
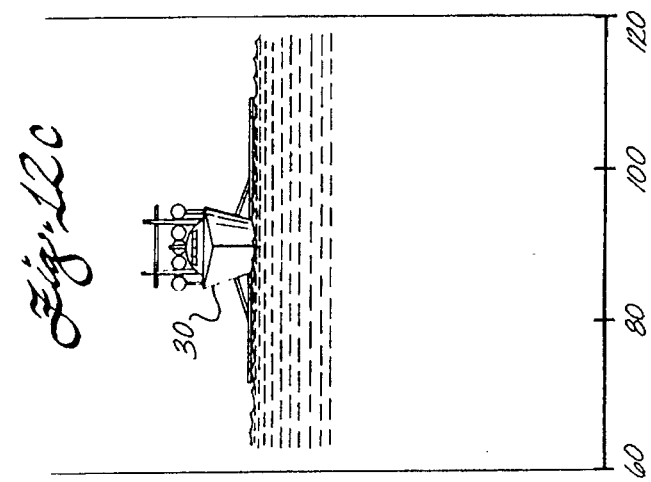
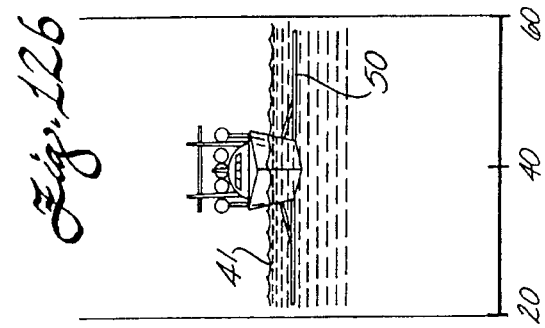
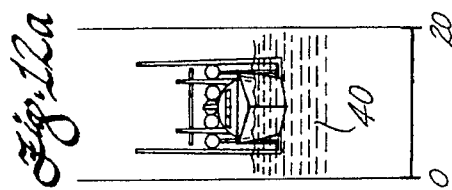

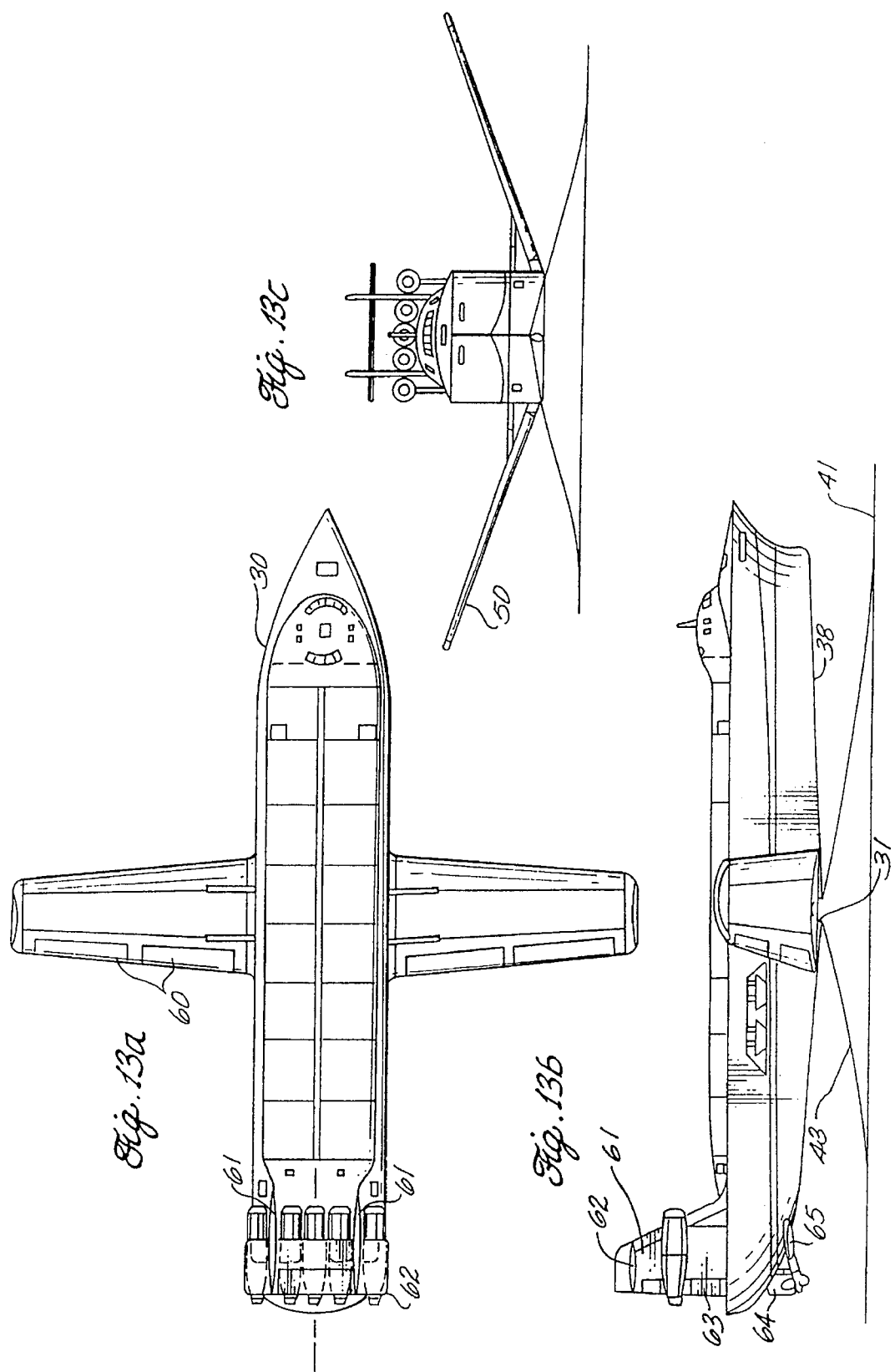

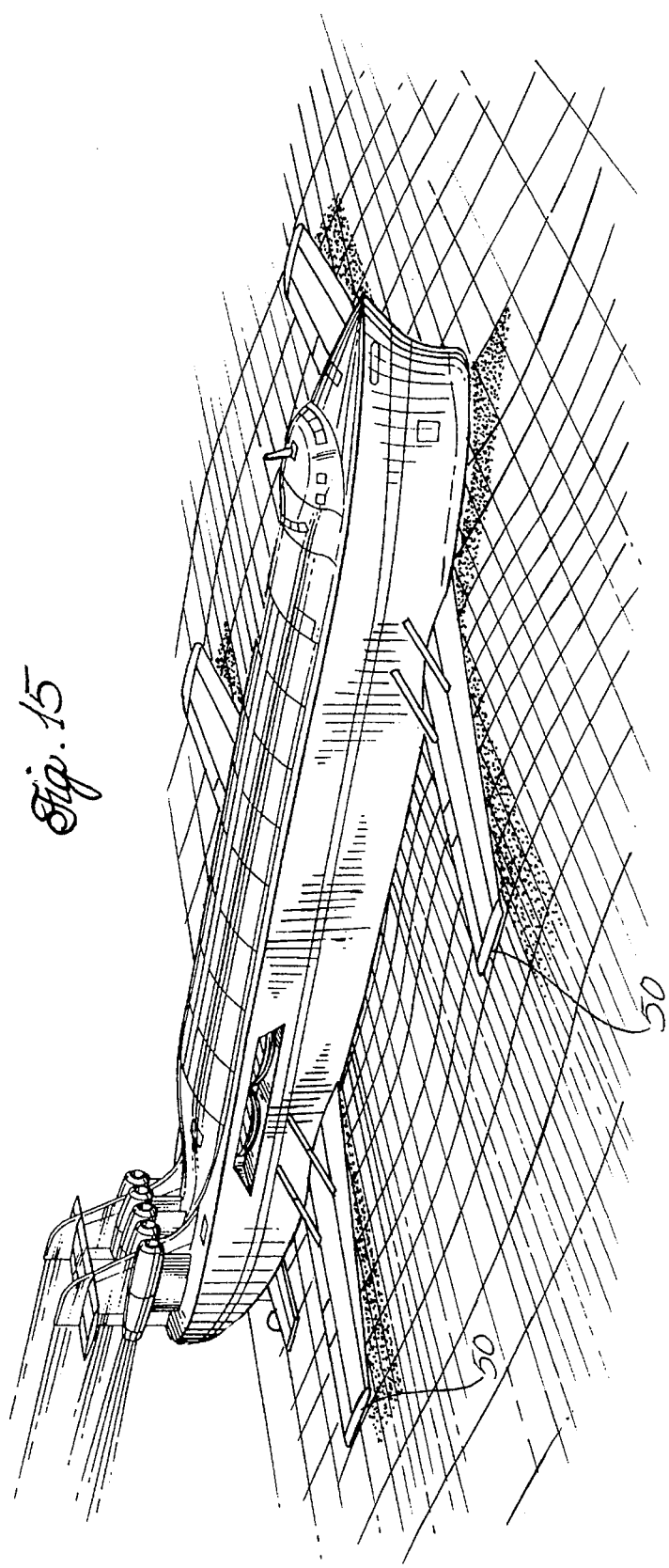

MULTIPLE CONCAVITY SURFING SHIP AND TRANSITION SYSTEM

RELATED APPLICATION INFORMATION

The present application is a continuation-in-part of U.S. patent application Ser. No. 08/261,429 filed on Jun. 17, 1994 now U.S. Pat. No. 5,398,628, which is, in turn, a continuation-in-part of U.S. patent application Ser. No. 08/078,604 filed on Jun. 17, 1993 entitled SURFING SHIP TRANSITION SYSTEM now abandoned.

BACKGROUND OF THE INVENTION

A basic system to provide efficient high speed ocean transport was disclosed in U.S. Pat. No. 3,274,966 issued Sep. 27, 1966, outlining a ship having a concave underside to generate a singular water wave from the forward motion of the ship, on which the ship rides above the rough ocean surface. At rest and at low speed this ship operates in a conventional displacement mode, where lift is provided by buoyancy forces. Speed in this mode is limited by wave drag due to water waves generated on the ocean surface. At high speed the concave bottom of the ship generates a singular water wave and rides on its crest in a dynamic lift mode referred to as surfing. In this mode the bulk of the ship is above the ocean surface with substantially reduced hull wetted area and surface friction, enabling cruise speeds in excess of 100 knots.

Transition between the low speed displacement mode and the high speed surfing mode requires additional provisions to generate sufficient dynamic lift at intermediate speeds to raise the ship from its displacement position, immersed in the water, to its cruise position on the crest of the surfing wave, and to provide stability and control to the ship when it rises above the ocean surface. Co-pending patent application Ser. No. 08/261,429 defines an invention providing for the transition requirements in practical operation of a surfing ship.

In ships with significant length and varying cargo loading requirements, stability and control of the surfing ship in both the transition mode and surfing mode may be limited by a single concavity and transition system located proximate the center of gravity. Enhanced capability for design and operation of surfing ships employing the invention with greater pitch stability and relaxed requirements for precise cargo loading is desired. These needs define the requirements for the present invention.

SUMMARY OF THE INVENTION

The present invention provides multiple nested concavities and/or transition systems for transition of a surfing ship from a standard displacement mode of operation through a lifting transition to a surfing mode relying on a single or multiple surfing waves. The transition systems enable the surfing ship to climb up and out of the water at intermediate speeds to reach its high speed surfing position above the ocean surface, and enable the surfing ship to maintain stability and control when it rises above the ocean surface. These transition systems are directed toward maximum use of surface area and span to generate lift at low speeds, with this area decreasing to reduce drag as the ship gains speed and water clearance, and toward advantageous use of aerodynamic and hydrodynamic effects to maintain stability and control.

Two complementary transition means are provided to lift the ship up to the ocean surface. The first means are pairs of retractable hydrofoils, one hydrofoil of each pair on each side of the ship near its bottom. The second means are multiple sets of nested concavities of increasing camber on the bottom of the ship itself, the innermost concavity having a surfing plate of variable camber. These two means are complementary in that at low speeds the hydrofoils extend sideways to provide a large continuous span to increase lift with modest induced drag. As the ship gains speed and rises in the water, the hydrofoils are retracted or raised into the air at a significant dihedral angle, reducing the wetted area and drag. At higher speeds approaching cruise in a preferred embodiment, the wetted area of the ship is further reduced by the shape of the nested concavities.

The hydrofoils are a lifting shape in section and extendable from the sides of the ship, thereby providing an increased area, large aspect ratio, lifting planform. These hydrofoils generate additional lift at intermediate transition speeds with acceptable induced drag, thus helping to lift the ship out of the water to attain its position on the wave crests generated by the concavities for high speed surfing operation. Hinge or pivoting mechanisms connect the hydrofoils to the ship enabling these foils to be extended under water to provide additional lift at intermediate or transition speeds, to be extended in the air at a significant dihedral angle to provide aerodynamic roll stability during the later stages of transition and high speed cruise, and to be retracted for low speed displacement operation and docking as well as for high speed cruise, if desired. The retraction mechanism enables the hydrofoils to operate at intermediate dihedral positions either under water or above the surface to provide roll stability. The mechanisms in addition incorporate provisions for changing the hydrofoil angle of attack.

Single or multiple nested bottom concavities, disposed along the bottom of the hull of the ship, are of increasing camber towards the center of the nest. At low speed the water wave associated with each concavity initially contacts an extensive portion of the ship bottom. As the ship gains speed, the wetted area decreases symmetrically fore and aft, increasing its load intensity or pressure per square foot. This increase in load intensity pushes a singular water wave associated with each concavity higher with an increased slope near its crest, further decreasing the bottom wetted area and lifting the ship further upwards on the ocean surface. Thus the contact area initially shrinks with increasing speed from an extensive concavity to a short concavity in each nested set. However, as speed continues to increase, the wave steepness will decrease, with the wave becoming more flat at its highest speed. In a first embodiment, the successive concavities are discrete, each bounded by well defined forward ramps and aft steps. In a second embodiment, the ramps are smoothed into a continuous convex/concave scalloped profile. A variable camber surfing plate bridging the innermost concavity first increases its camber as the ship moves through the speed where the convex wave is steepest, and thereafter decreases its camber as the ship's speed continues to increase and the convex wave becomes more flat for highest speed operation. In alternative embodiments, the variable camber surfing plate can be used in the single longitudinal concavity to match the shape of the water wave throughout the range of cruise speeds, replacing nested concavities. In this manner the ship bottom is shaped to conform to the generated convex wave over a range of operating speeds during its transition until finally reaching its high speed cruise mode.

When it rises above the ocean surface, the ship achieves further stability and control in the following manner. The addition of ailerons on the hydrofoils provides aerodynamic roll and pitch control when the hydrofoils are extended above the water at a dihedral angle. Aerodynamic stability and control surfaces, such as a conventional tail with a horizontal stabilizer and elevator as well as vertical fins and rudders, enhance aerodynamic yaw and pitch stability and control.

The use of multiple sets of nested concavities and/or hydrofoil pairs spaced along the bottom of the hull of the ship provides greater pitch stability and allows the requirements for precise cargo loading around the ship center of gravity to be relaxed.

BRIEF DESCRIPTION OF THE DRAWINGS

The foregoing and other readily apparent features of the present invention will be better understood by reference to the following more detailed specification and accompanying drawings wherein:

FIG. 4a shows the surfing ship operating in the displacement mode at a speed of approximately 10 to 20 knots;

FIG. 4b shows the surfing ship operating in a transition mode at a speed of between approximately 20 and 60 knots;

FIG. 4c demonstrates the ship in the surfing mode at a speed of between approximately 100 and 200 knots;

FIG. 5 is a graphical chart presenting calculated parameters as a function of the ship speed to illustrate the ship force scenario in several curves, namely a. Dynamic Lift
b. Displacement Lift
c. Lifting Surface Wetted Area
d. Lift Coefficient $C_L$
e. Lift/Drag (L/D) Ratio
f. Horsepower;

FIG. 6a is a rear sectional view of the ship showing the water surface in the displacement mode, transition mode and surfing mode and the hydrofoil transition system at various dihedral angles and vertically retracted.

FIG. 6b is a top view of the hydrofoil attached to the side of the ship.

FIG. 6c is a front view of the hydrofoil showing the hinge system and dihedral angle.

FIG. 6d is a side view of the hydrofoil.

FIG. 7 illustrates a front view of a combination hydrofoil transition mechanism for variation of both dihedral and attack angles.

FIG. 8a is a top view showing a first embodiment of the storage mechanism for the hydrofoils.

FIG. 8b is a side view of the first embodiment of the storage mechanism for the hydrofoils.

FIG. 9a is a side view of a second embodiment of the hydrofoil retraction system showing a first vertical intermediate retraction position and a second stowed position.

FIG. 9b is a top view of a second embodiment of the hydrofoil storage system shown in FIG. 9A.

FIG. 10a is a side view of a third embodiment of the hydrofoil storage system.

FIG. 10b is a top view of the third embodiment of the hydrofoil storage system.

FIG. 11 is a rear sectional view of a preferred embodiment of the hydrofoil transition system at various dihedral angles and vertically retracted.

FIGS. 12a–d are a sequence of front sectional views at varying speed ranges showing the position of the hydrofoils during the full range of operating speeds.

FIG. 13a is a top view showing the hydrofoil ailerons and the aerodynamic stability and control surfaces affecting yaw.

FIG. 13b is a side view showing the aerodynamic stability and control surfaces affecting pitch, the hydrodynamic stability and control surfaces affecting pitch and yaw, and the upswept ship bottom.

FIG. 13c is a front view showing the hydrofoils extended at a dihedral to enhance aerodynamic stability and control in roll during surfing mode.

FIG. 15 is a perspective view of the surfing ship employing multiple concavities and hydrofoil pair transition lifting systems riding on multiple self generated waves created by the concavities.

DETAILED DESCRIPTION

Figure 1:
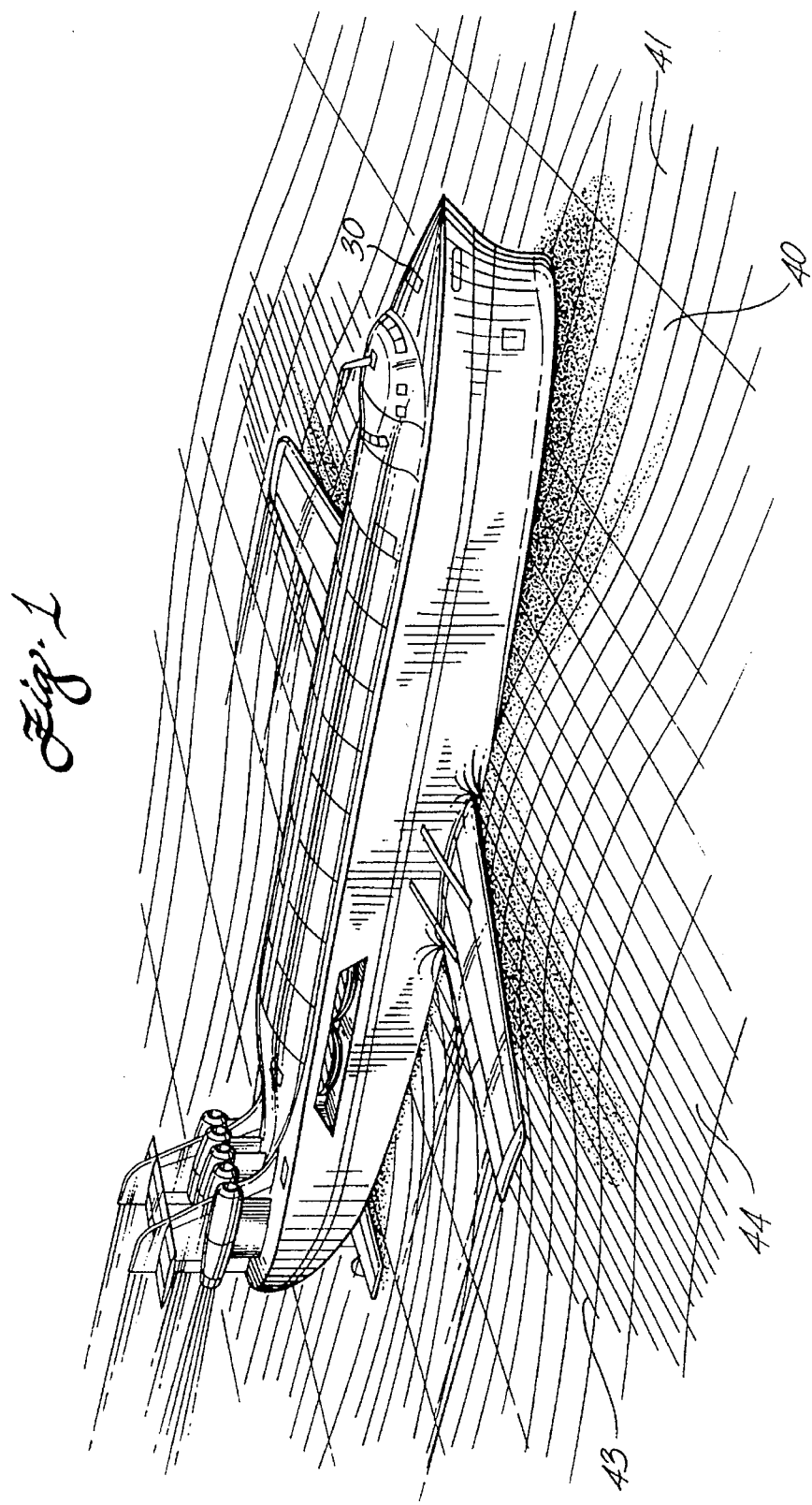
FIG. 1 is a perspective view of the surfing ship riding on the crest of its singular self-generated water wave at high speed.
Figure 2:
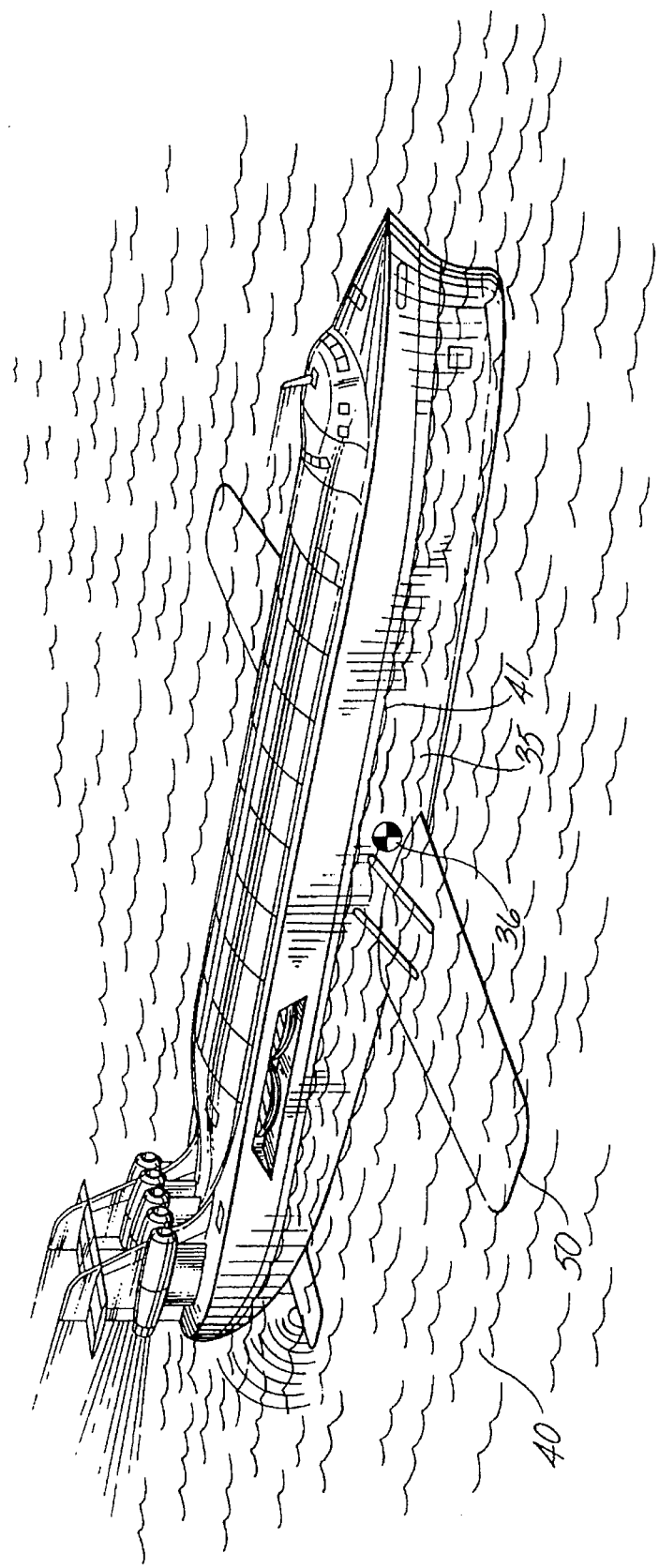
FIG. 2 is a perspective view of the surfing ship operating in its low speed displacement mode showing its retractable hydrofoils mounted on the sides of the ship in their extended positions under water at the beginning of the transition operation.
Figure 3A:
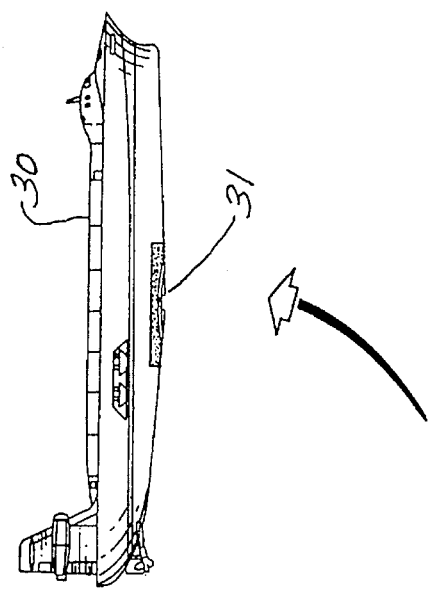
FIG. 3a is a side view of the surfing ship showing the location of the nested bottom concavities.
Figure 3B:
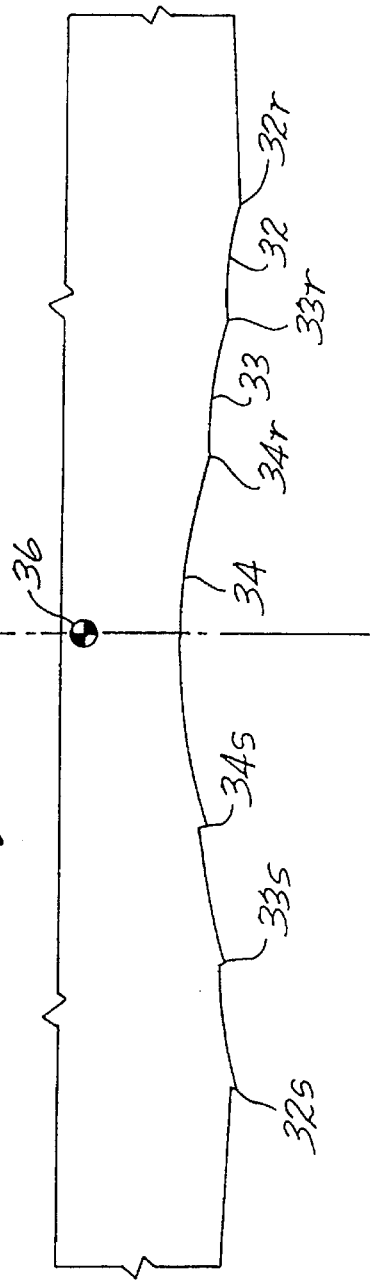
FIG. 3b is a detailed sectional view of the bottom of the ship showing the concavities in the nested form.
Figure 3C:
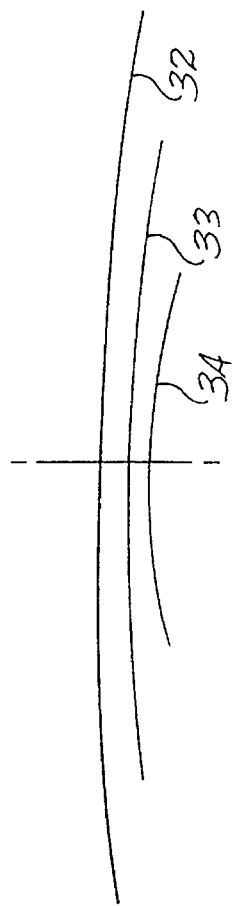
FIG. 3c demonstrates the relative curvature of the various concavities which are shown in FIG. 3B.

The surfing ship operates in the ocean in a conventional displacement mode at low speeds limited by its generation on the ocean surface of dissipative surface water waves. The ship 30 is shown in FIG. 1 in its high speed mode generating on the ocean surface 41 the singular surfing wave 43 and riding on its crest 44. Auxiliary means are required for the ship 30 to climb out of the water 40 to attain this high speed mode, and to maintain stability and control as the ship 30 rises above the ocean surface 41. Two complementary transition means are provided in the embodiments of the present invention shown in the drawings, namely retractable hydrofoils 50 as shown in FIG. 2 and a concave ship bottom 31 having nested bottom concavities 32, 33 and 34 as shown in FIG. 3. Hydrofoils 50 are the primary lift mechanism at low speeds, whereas the nested bottom concavities 32–34 are particularly beneficial at high speeds. Means for enhancing stability and control include aerodynamic stability and control surfaces 60–63, hydrodynamic stability and control surfaces 64–65, an upswept ship bottom 38, and the hydrofoils 50 extended at a dihedral angle, all as shown in FIG. 13.

The surfing ship 30 is shown in FIG. 2 in its displacement mode with its hydrofoils 50 in their side mounted positions below the ocean surface 41 extending from the ship lower sides 35 near its fore-and-aft center of gravity 36. These hydrofoils 50 are mounted adjacent the nested bottom concavities 32–34, which are similarly disposed symmetrically about the ship center of gravity 36, providing a spanwise extension of the ship concave bottom 31 and hence a major increase in total lifting area and span.

The hydrofoils 50 when so extended, and to a lesser extent the nested bottom concavities 32–34, lift the ship up and out of the water 40 to the ocean surface 41 at intermediate speeds as shown in the sequence of FIGS. 4a–c and FIGS. 12a–d. This transition operation is coincident with generation of the surfing wave 43 which raises the ship 30 up and on its crest 44.

The ship 30 is shown in its displacement mode in FIG. 4a immersed in the water 40, moving at low speed of the order of 10–20 knots with the hydrofoils 50 extended but at zero angle of attack. When the hydrofoils are rotated to provide a modest angle of attack of approximately 12 degrees, they generate a large lift force, lifting the ship upwards, reducing its hull wetted area and generation of its dissipative surface waves, resulting in an increase in speed. In this manner the ship 30 will rise up as shown in the transition mode of FIG. 4b operating at intermediate speeds such as from 20 to 60 knots riding at an elevated level in the water 40 and generating a modest surfing wave 43. As the lifting process/speed increase continues, the ship 30 will rise further in the water 40 and ride on the wave crest 44 at still higher speeds. At this point the hydrofoils 50 will emerge from the water 40, as shown in FIG. 12c, and may be cleared of the ocean surface 41 more by swinging them upwards in a dihedral angle, as shown in the surfing mode of FIG. 4c and FIG. 12d, reducing their water drag, and providing lateral stability. This allows still further increases in speed whereby the concave bottom of the ship 31 generates all of the dynamic lift, but over an extended fore-and-aft length of its bottom 31.

With the ship 30 substantially clear of the water surface 41, the speed can increase further, and the bottom wetted area will continue to decrease. The ship will then be operating at high speed in a dynamic lift mode on the surfing wave 43, initially supported on an extensive portion of the concave ship bottom 31. The water will then contact only the successively reduced chord length/increased camber of the nested concavities 32–34 as the increased loading over the decreasing wetted area increases the height of the surfing water wave 43 and its crest slope 44. As the ship 30 gains further speed, the wetted bottom area will decrease to that of the most extensive concavity 32, bounded by its forward ramp 32r and its aft step 32s, as shown in FIG. 3. With a further increase in speed the wetted area will decrease to the next concavity 33 of lesser extent and increased camber, bounded again by its forward ramp 33r and its aft step 33s. Finally the bottom wetted area will decrease to its innermost concavity 34 of maximum camber, bounded by its forward ramp 34r and its aft step 34s.

Figure 14:
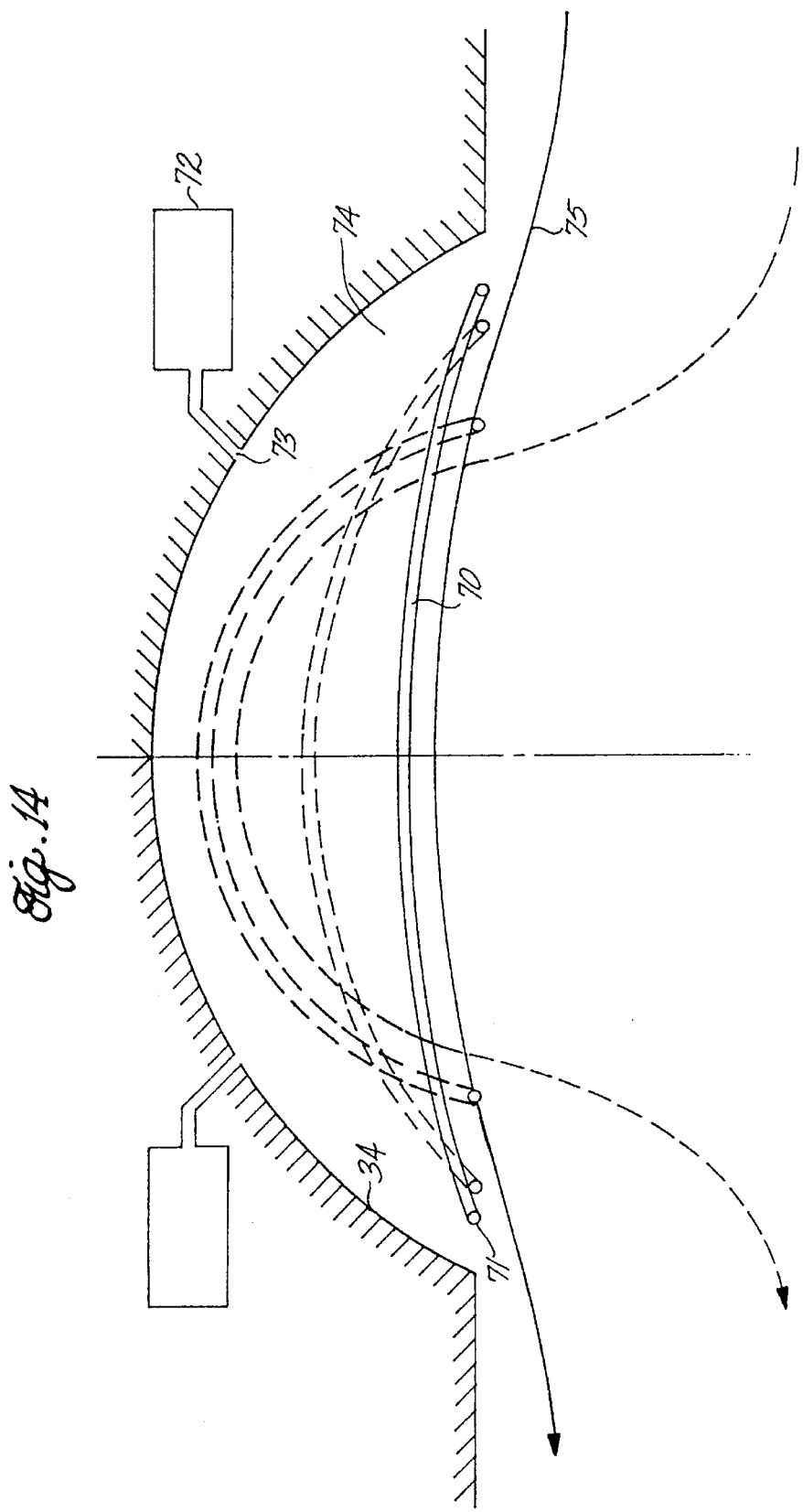
FIG. 14 is a sectional view showing the flexible surfing plate at various cambers in the innermost nested concavity.

The innermost concavity 34 is bridged by a flexible surfing plate 70, with hinges 71 at the fore and aft lower boundaries of the cavity, as shown in FIG. 14. Thus, when the bottom wetted area decreases to its innermost concavity 34, the wetted area will consist of the concave surface of the surfing plate 70. Means are provided to move one or both hinges 71 toward the center of the cavity 34, thus compressing the surfing plate 70 and bending it upward into the cavity 34, which provides an increased camber to determine the water wave shape 75. Various degrees of camber may be provided by suitable translational motion of the hinges 71. One or more water pumps 72 support the flexible plate by injecting high pressure water through openings 73 into the region 74 between the surface of the innermost concavity 34 and the convex surface of the surfing plate 70. Means are known in the art for matching the water pressure in the region 74 with the pressure along the wave shape 75, or for otherwise preventing disruption of the wave shape 75 by leakage into the region 74.

When the wetted area decreases to the innermost concavity 34, the surfing plate 70 increases in camber to match the increasing steepness of the wave shape 75 until the wave steepness peaks. As the speed continues to increase, the wave steepness decreases, and the surfing plate 70 decreases in camber accordingly, with the wave becoming more flat for highest speed operation.

This transition scenario is further illustrated in a quantitative sense by the approximate calculated parameters of FIG. 5, shown for a 30,000 ton ship 30 as functions of the ship speed in knots. In this figure, curves begin with initiation of transition at 20 knots or less by extension of the hydrofoils and their rotation to their maximum angle of attack, say 12 degrees. Curve a shows that at 20 knots the hydrofoils generate a dynamic lift force of approximately half the ship weight, with the remaining half of the weight borne as displacement lift, as shown by curve b, allowing the ship to rise in the water, with a corresponding reduction in lifting surface wetted area, as shown by curve c. The lifting area is the sum of the hydrofoil area and the adjacent concave hull area, where the hydrofoil lifting area, particularly if at a dihedral angle, is reduced as its tips emerge from the water, and the hull lifting area is correspondingly reduced as the surfing wave becomes more convex. In this initial low speed lift mode the hydrofoils are operating at their maximum lift coefficient as shown by curve d, generating a corresponding large induced drag and a precipitous drop in the lift/drag (L/D) ratio, as shown by curve e. However, as the ship gains speed and water clearance, the surface wave generation, wetted area, induced drag, and friction drag will all decrease, and the ship will climb further out of the water. The angle of attack will be continually reduced with a corresponding decrease in the lift coefficient. At some intermediate speed the hydrofoils will emerge from the water as the ship rises, and may be extended at a dihedral angle to enhance aerodynamic stability and control in roll or retracted fully if stability is otherwise maintained. As shown in curve e, the drag reduction will correspond to a linear increase in the lift/drag (L/D) ratio, which is proportional to speed and/or the Froude number in the surfing mode. The horsepower required will increase with speed, as shown in curve f, rapidly in the early transition mode when the drag due to hydrofoil dynamic lift is large, but will level off as the drag is sharply reduced in the surfing mode as the wetted area is further decreased due to the nested bottom concavities 32–34 as the ship rides on the wave crest 44.

Mechanical arrangements for retracting the side mounted hydrofoils 50 are shown in FIGS. 6 through 10. The arrangements all provide for the hydrofoil retracting by swinging about a hinge or pivot at its root; in all cases also allowing intermediate dihedral positions for partial retraction and to provide roll stability and control. These arrangements also enable a change in angle of attack of the hydrofoils, provided either by rotation of the hydrofoils or by deflection of a trailing edge flap, or by some combination of these two means.

A simple arrangement for mounting the hydrofoils 50 on the lower sides of the ship 35 is shown in FIGS. 6a–d. The hydrofoil 50 is mounted at its root 51 on a horizontal hinge 52 to swing from its lowered position extending sideways 50e from the ship 30 upwards through any desired dihedral angle position 50d into a vertical position 50v for stowage during low speed displacement operation and docking and during high speed cruise if stability is otherwise maintained. A pivot 55a outboard of this hinge 52 to rotate the hydrofoil 50 in a plane 53 about its quarter chord front spar 54 is also provided, together with a motor 55b or other means to drive this rotation located at the three quarter chord aft spar 55.

The surfing wave extends to the sides of the ship 30, as shown by the wave profiles 43 in FIG. 6a, namely, 41s for the surfing mode, 41t for the transition mode, and 41d for the displacement mode, corresponding to the profiles shown earlier for the surfing wave 43 in the transition sequences of FIG. 4 and FIG. 12.

The discrete mechanisms for dihedral and attack angle variations of FIGS. 6b and c may be combined into a single mechanism as shown in FIG. 7. In this arrangement the mechanism for attack angle rotation about the front spar 54 is mounted on the dihedral hinge 52, and in this sense these two mechanisms are combined. Again a motor or other means to drive the rotation about the front spar is located on the aft spar 55.

A preferred embodiment of an actuator mechanism for rotating the hydrofoil 50 about the horizontal hinge 52 is shown in FIG. 11. During transition, the hydrofoils 50 will rise in the water 40 until their lower surfaces ride on the ocean surface 41, as shown in FIG. 12c. At this point, the extensive lower surface area of the hydrofoils 50 provides the surfing lift necessary to sustain the ship 30 as it accelerates to higher speeds where the ship hull lower surface itself can generate its sustaining force. Thus, at this point, it is preferred that the hinge mechanism enable the hydrofoils 50 to completely remove the ship hull 35 from the water 40 to avoid the hull's excess surface friction drag. To accomplish this, the horizontally extended hydrofoils 50e must be located below their hinge points 52. The hinge connection mechanism must then include an angle such as an "S" or an "L" member 80 between the hinge point 52 and the hydrofoil root 59.

In FIG. 11, the hydrofoil 50 is rotated about its hinge 52 by means of a strut arm 81 with a root hinge 82 at its root, a scissor hinge 83 disposed along its length, and a joining hinge 84 connecting it to a point along the length of the hydrofoil 50. In this embodiment, the hydrofoil 50 can be extended to horizontal position 50e for transition, extended at some dihedral angle, such as 20 degrees, to position 50d for cruise, and retracted to a vertical position 50v for stowing. The successive motions of the hydrofoil 50 are accomplished as follows. To raise the hydrofoil 50 from horizontal position 50e to some dihedral angle position 50d, a motor 85 or other means first raises the root hinge 82 of the strut arm 81 vertically while the strut arm 81 remains rigid. Then, to retract the hydrofoil 50 to its vertical position 50v, the motor 85 scissors or collapses the strut arm 81 about its scissor hinge 83 and retires strut arm 81 within the cavity 39 in the ship's lower side 35. To lower the hydrofoil 50 from its vertical position 50v to cruise position 50d, the motor 85 un-scissors and extends the strut arm 81 to its full length. To further lower the hydrofoil 50 from cruise position 50d to transition position 50e, the strut arm root hinge 82 is lowered vertically by the motor 85 while the strut arm 81 remains rigid.

The hydrofoils 50 may also be retracted in a horizontal plane as shown in FIGS. 8a and b. In this retraction arrangement the hydrofoils 50 are swung horizontally about pivots 56 into cavities 37 located in the bottom of the ship 30. A hinge 52 is provided to swing the hydrofoils 50 up for dihedral angle variation 50d. Angle of attack rotation again is provided about the front spar 54 actuated by a driver located at the aft spar 55.

The hydrofoils 50 may also be retracted to a position 50a at the sides of the ship 30 as illustrated in FIG. 9. This retraction system is similar to that of vertical retraction 50v as shown in FIG. 6, but with the added feature that after the hydrofoils are swung up to an intermediate vertical position 50v about a hinge 52, they are then, in a second movement, rotated about a pivot 57 down to a stowed position 50a at the side of the ship 30. The dihedral swing up and rotation down to the alongside stowed position may, if desired, be combined into a single movement.

Finally, the hydrofoils 50 may be rotated about their quarter chord 54 to a –90 degree attack angle as a first step, as illustrated in FIG. 10. As a second step the hydrofoils 50 may then be swung aft about the hinge 58 alongside the hull of the ship 30.

When the ship 30 rises above the ocean surface 41 and surfs on the wave crest 44, its center of gravity is above the surfing plate 70, so the ship 30 may require means for maintaining stability and control. The present invention discloses a two-level stability and control system with both aerodynamic controls and back-up hydrodynamic controls. As shown in FIG. 13c, extension of the hydrofoils 50 in the air at a significant dihedral angle provides aerodynamic restoring forces that enhance stability in roll. Moreover, ailerons 60 on the hydrofoils 50, as shown in FIG. 13a, provide aerodynamic control in roll. Aerodynamic pitch and yaw stability and control are further enhanced by surfaces such as a conventional tail 61 with a horizontal stabilizer and elevator 62, as well as vertical fins and rudders 63, all as shown in FIGS. 13a–c. Finally, as shown in FIG. 13b, the ship bottom 38 sweeps upwards at an angle from the flat or horizontal surface either fore, or both fore and aft, of the concave ship bottom 31 to provide displacement and aerodynamic restoring forces that further enhance pitch stability. The upsweeping of the ship bottom 38 also minimizes excessive water contact and friction by providing ample clearance between the ship bottom 38 and the ocean surface 41, even when the surfing wave 43 becomes more flat as speed increases above the speed corresponding to peak wave steepness.

In addition, a back-up hydrodynamic system is provided for the event of an unusual disturbance, such as an occasional high water wave. On the bottom aft end of the ship 30, a horizontal stabilizer surface and elevator 65 complement the conventional aft water rudder 64, as shown in FIG. 13*b*, to provide back-up hydrodynamic stability and control in pitch and yaw.

Propulsion for the ship may be provided by conventional water propeller mechanisms 90 during displacement and transition, as shown in FIGS. 4*a–b*. Propulsion during transition and high speed cruise may also be provided by means disclosed in U.S. Pat. No. 3,274,966 or by jet engines 91, as shown in FIGS. 4*b–c*.

Aircraft are generally provided with both a singular lifting wing proximate their center of gravity and a second smaller "wing" called a horizontal stabilizer located at a remote distance either aft of the primary wing as in a conventional tail or forward of the wing as in a canard configuration. The stabilizer provides a large stability moment due to its remote location and large lever arm. If the stabilizer is located aft of the center of gravity, the system provides inherent stability. A movable surface attached to the stabilizer called an elevator provides pitch control.

An aircraft wing generates a positive pressure on its underside that proceeds forward to cause an upflow, which the wing changes to a downflow aft of this trailing edge. This forward upflow and aft downflow comprise a circulatory or vortex flow about the wing perimeter which combines with the translational flow to provide a wave which continues with the wing. The aft stabilizer similarly generates a second independent wave, and even for small aircraft these two waves co-exist to provide the functions described without interference.

The aircraft could alternatively be provided with two similar size primary wings, each at a considerable distance forward and aft of the center of gravity respectively. However, the aircraft is operating in essentially an unbounded atmosphere in the absence of any "ground plane" and hence if not precisely balanced could pitch excessively and perhaps even tumble.

Automobiles and trucks operate on a roadway which does comprise a "ground plane." Hence such vehicles are provided with two supporting sets of wheels, each at a considerable distance forward and aft of the center of gravity respectively. A downward pitch of either end of the vehicle, say by a disturbance or uneven loading, is stopped by the ground plane. So the vehicle cannot tumble and this permits considerable flexibility in its loading.

The surfing ship employs displacement lift at low speeds, a bottom concavity/hydrofoil pair lifting system for transition, and a bottom concavity lifting system for high speed cruise. The high speed dynamic lift mechanism operating on the water interface develops undersurface pressures generating a water wave on the interface in a manner quite similar to the mechanism wherein the pressures on a wing immersed either in water or air generate internal waves in those fluids.

This ship can employ a stability and control system similar to an aircraft, with a single concavity/hydrofoil pair proximate the center of gravity and a remote aft horizontal stabilizer, either aerodynamic or hydrodynamic, to provide stability and control. Thus the aft stabilizer could comprise an aft set of hydrofoils in the water or an aft stabilizer in the air. In this case both the wing and stabilizer will generate their own waves, which can operate independently as is the case with the aircraft.

However, the surfing ship operates on the water interface, which provides what might be described as a "soft ground plane." When either end of the ship is pitched down, say by a disturbance, the end of the ship that pitches into the water encounters a strong displacement restoring force. Thus this "ground plane" prevents the ship from excessive pitching much as the roadway forces autos and trucks to remain essentially level. This constraint enables the surfing ship to incorporate multiple lifting provisions, in this case concavity/hydrofoil combinations, located at a considerable distance both fore and aft of the center of gravity, thereby providing enhanced flexibility in cargo loading, as is the case with fore and aft sets of wheels for the road vehicles.

Referring to FIGS. 15 and 16*a–e*, additional embodiments of the invention employing multiple lifting systems for added stability and/or control are shown. FIG. 15 shows a surfing ship employing two lifting systems, one forward and one aft of the center of gravity, each employing a pair of hydrofoils generally designated 50 to assist in transition from the displacement mode to the surfing mode as previously described. Each lifting system also employs a concavity and preferably a set of nested concavities each generating a surfing wave as previously described. This dual system provides greater pitch stability and relaxes the requirements for precise cargo loading around the center of gravity of the ship. The dual system also allows greater hydrofoil area to benefit transition capability with smaller span to minimize structural loads.

Figure 16A:
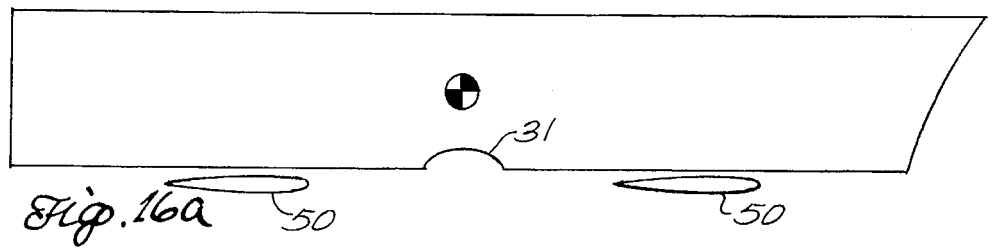
FIG. 16a is a side cross-sectional view of an embodiment of the surfing ship of the present invention employing a single set of nested concavities proximate the center of gravity of the ship and two pairs of lifting hydrofoils symmetrically spaced fore and aft of the ship's center of gravity.
Figure 16B:
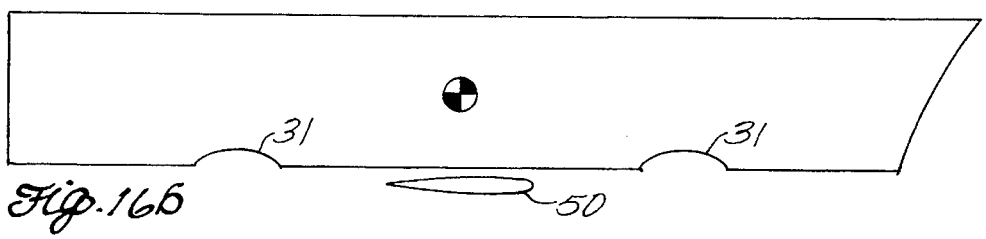
FIG. 16b is a side cross-sectional view of an embodiment of the surfing ship of the present invention employing two sets of nested concavities displaced fore and aft of the center of gravity and one pair of lifting hydrofoils located proximate the center of gravity of the ship.
Figure 16C:
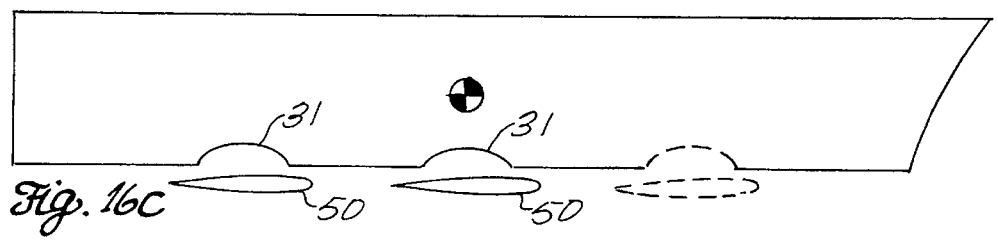
FIG. 16c is a side cross-sectional view of an embodiment of the surfing ship of the present invention employing two sets of nested concavities, one located proximate the center of gravity of the ship and a second located aft of the center of gravity of the ship, with an alternate location for the second set of concavities forward of the center of gravity shown in phantom, and with a pair of hydrofoils located adjacent each set of concavities.
Figure 16D:
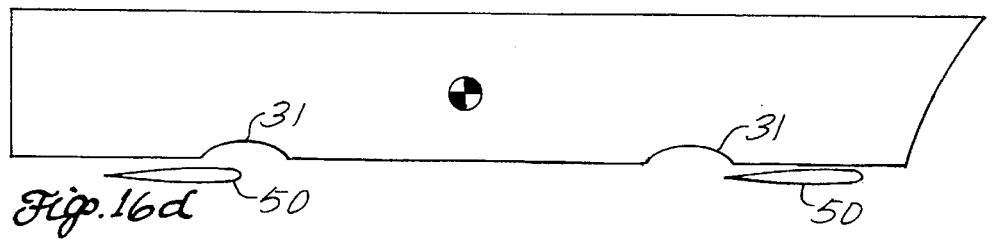
FIG. 16d is a side cross-sectional view of an embodiment of the surfing ship of the present invention employing two sets of lifting systems, each comprising a set of nested concavities and a pair of hydrofoils located proximate the concavities.
Figure 16E:
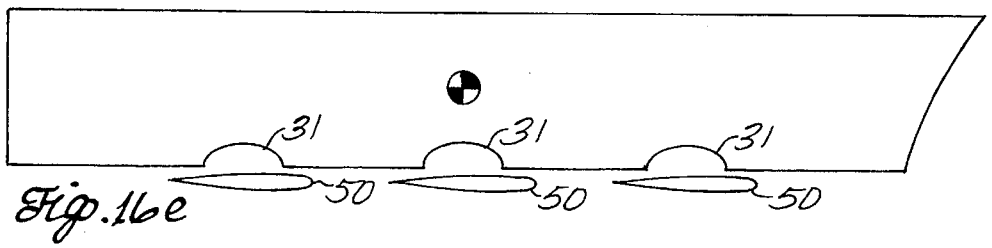
FIG. 16e is a side cross-sectional view of an embodiment of the surfing ship of the present invention employing a plurality of lifting systems, each comprising a set of nested concavities and a pair of hydrofoils spaced along the bottom of the hull of the ship.

FIGS. 16*a–e* show embodiments of the invention employing single and multiple sets of concavities generally designated 31 in combination with single and multiple pairs of hydrofoils generally designated 50. FIG. 16*a* shows one nested concavity at the center of gravity, with two pairs of hydrofoils, one forward and one aft of the center of gravity. FIG. 16*b* shows one pair of hydrofoils at the center of gravity, with two nested concavities, one forward and one aft of the center of gravity. FIG. 16*c* shows one nested concavity and a pair of adjacent hydrofoils at or near the center of gravity with a second nested concavity and pair of adjacent hydrofoils either forward or aft of the center of gravity to provide stability and control. FIG. 16*d* shows two sets of lifting systems, each comprising a nested bottom concavity and a pair of side mounted hydrofoils, one system fore and one system aft of the center of gravity. The hydrofoils are located proximate but not necessarily adjacent to the associated nested bottom concavity. FIG. 16*e* shows three sets of lifting systems, each comprising a nested bottom concavity and a pair of side mounted hydrofoils. In the figure one set is located at the center of gravity, a second set forward and a third set aft. It will be appreciated that a plurality of lifting systems distributed longitudinally along the bottom of the hull of the ship can be employed to provide lift and either longitudinal stability or longitudinal control.

While the preferred form and method of employing the invention have been described and illustrated, it is to be understood that the invention lends itself to numerous other embodiments without departing from its basic principles.

It is clear from this disclosure and its accompanying set of figures that the means of achieving efficient high speed ocean transport with a surfing ship, including means to enable the ship to make the transition from its low speed displacement mode to its efficient high speed mode operating on the crest of self-generated surfing wave, and means for maintaining stability and control during transition and cruise, have been described in detail, and the magnitude of the provisions disclosed may be varied according to engineering considerations for different conditions as required.

Having thus described my invention what I claim as novel and desire to secure by Letters of Patent of the United States is:

What is claimed is:

1. An improved water surfing ship employing dynamic lift allowing high speed operation with minimum drag, the improvement comprising:

a hull having a bottom including at least two portions which are longitudinally concave down, said portions spaced along the bottom of the hull of the ship, said concave portions each generating a singular water wave at high speed, each said concave portion further conforming to a convex shape of the water wave, said convex shape dependent on the speed of the ship, and each concave portion includes means for matching the convex shape allowing the ship to ride on the crests of the waves.

2. A ship as defined in claim 1 wherein the means for matching the convex shape of the water wave includes a flexible plate that varies its camber, allowing the ship to ride on the crests of the waves.

3. A ship as defined in claim 1 wherein said concave portions each further comprise a plurality of nested concavities of increasing camber, each concave portion defined by a forward ramp and an aft step for conforming to a convex shape of the water wave, said convex shape dependent on the speed of the ship.

4. A water surfing ship employing dynamic lift, allowing high speed operation with minimum drag, comprising:

a hull with a bottom, including at least two portions which are longitudinally concave down, said at least two portions each generating a singular water wave at high speed; and at least one pair of hydrofoils extending outwardly from the hull, said hydrofoils providing lifting area and span, generating lift to raise the ship vertically in the water to reduce wetted area and drag.

5. A ship as defined in claim 4 wherein the at least one pair of hydrofoils attach to the hull at a location wherein a center of pressure for the hydrofoils is substantially a spanwise continuation of a bottom pressure created by the at least one concave portion.

6. The ship as defined in claim 4 wherein the hydrofoils are incrementally retractable from a fully extended position through increments of dihedral angle predetermined to provide efficient lift and minimum drag at predetermined speeds.

7. A ship as defined in claim 6 further including means for complete retraction for docking and high speed cruise wherein the concave portion provides complete lift for the ship.

8. A ship as defined in claim 6 further comprising retraction means including:

a horizontal dihedral hinge enabling each hydrofoil to swing upwards from a horizontal operating position through intermediate dihedral positions to a retracted vertical position for docking and high speed cruise; and pivoting means at the hydrofoil center of pressure enabling a change in the effective angle of attack of the hydrofoil.

9. A ship as defined in claim 8 wherein the dihedral hinge and pivoting means comprise a single universal joint.

10. A ship as defined in claim 6 further comprising:

a means to swing the hydrofoils horizontally for retraction wherein the hull of the ship further includes slots to receive the hydrofoils; and means to vary the effective angle of attack of the hydrofoils.

11. A ship as defined in claim 10 further comprising means for varying the dihedral angle of each hydrofoil.

12. A ship as defined in claim 6 further comprising:

means to rotate the effective angle of attack of the hydrofoils to approximately 90°; and means to swing the hydrofoils along side the ship hull.

13. A ship as defined in claim 4 wherein the hydrofoils further incorporate means for varying the effective angle of attack.

14. A ship as defined in claim 13 wherein the means for varying the effective angle of attack comprises means for rotating the hydrofoils about a spanwise axis.

15. A ship as defined in claim 13 wherein the means to vary the effective angle of attack comprises a trailing edge flap controllably rotatable about a spanwise axis.

16. A water surfing ship employing dynamic lift, allowing high speed operation with minimum drag, comprising:

a hull with a bottom, including a plurality of portions which are longitudinally concave down, said portions each generating a singular water wave at high speed; and a plurality of pairs of hydrofoils extending outwardly from the hull.

17. A ship as defined in claim 16 wherein the hydrofoils are incrementally retractable from a fully extended position though increments of dihedral angle predetermined to provide efficient stability and minimum drag at predetermined speeds.

18. An water surfing ship as defined in claim 16 wherein said hydrofoils provide aerodynamic restoring forces to enhance stability in roll when said hydrofoils rise into the air above the water.

19. A ship as defined in claim 17 further comprising retraction means including:

a strut arm for each hydrofoil including a root hinge connected to the hull of said ship, a joining hinge connecting said strut arm to each hydrofoil, and a scissor hinge disposed intermediate said root hinge and said joining hinge;

means for vertically raising and lowering said root hinge; and means for collapsing and straightening said strut arm about said scissor hinge.

20. A ship as defined in claim 16 wherein one or more ailerons are disposed along the hydrofoils to provide aerodynamic control in roll or pitch.

21. A water surfing ship as defined in claim 16 wherein at least one of said concavities is forward of a center of gravity of the ship and at least a second one of said concavities is aft of said center of gravity.

22. A water surfing ship as defined in claim 16 wherein at least one of said pairs of hydrofoils is forward of a center of gravity of the ship and at least a second one of said pairs of hydrofoils is aft of said center of gravity.

23. A water surfing ship employing dynamic lift, allowing high speed operation with minimum drag, comprising:

a hull of given length and beam with a bottom, including at least one portion substantially less than the length of the hull and extending entirely across the beam of the hull which is longitudinally concave down, said at least one portion generating a singular water wave at high speed.

24. A water surfing ship as defined in claim 23 further comprising at least one pair of hydrofoils extending outwardly from the hull, said hydrofoils providing lifting area and span, generating lift to raise the ship vertically in the water to reduce wetted area and drag.

* * * * *

UNITED STATES PATENT AND TRADEMARK OFFICE
CERTIFICATE OF CORRECTION

PATENT NO.   : 5,582,123
DATED        : December 10, 1996
INVENTOR(S)  : Scott Rethorst It is certified that error appears in the above-indentified patent and that said Letters Patent is hereby corrected as shown below:

Title page, item [73] Assignee, delete "Pioneer Engineering, Grandview, Mo." and insert therefor -- Vehicle Research Corporation, South Pasadena, Ca. --.

Title page, Attorney, Agent or Firm, delete "Hovey, Williams, Timmons & Collins" and insert therefor -- Christie, Parker & Hale, LLP --.

Column 3, lines 55,57,59,60,63,65,67, change the period to a semi-colon (all occurrences).

Column 4, lines 3,5,7,9,12,15,17,21,24,26, change the period to a semi-colon (all occurrences).

Column 4, line 29, change "self generated" to -- self-generated --.

Column 4, lines 30,36,41,49, change the period to a semi-colon (all occurrences).

Column 4, line 54, change the period to -- ; and --.

Column 12, line 4, change "along side" to -- alongside --.

Column 12, line 26, change "An water" to -- A water --.

Signed and Sealed this

Tenth Day of June, 1997

Attest:

BRUCE LEHMAN

*Attesting Officer*         *Commissioner of Patents and Trademarks*